United States Patent [19]

Wharam

[11] 4,019,695
[45] Apr. 26, 1977

[54] TAPE CARTRIDGE WITH MOVABLE GUIDE MEMBER

[75] Inventor: John L. Wharam, Eagan, Minn.

[73] Assignee: Minnesota Mining and Manufacturing Company, St. Paul, Minn.

[22] Filed: Apr. 28, 1976

[21] Appl. No.: 680,902

[52] U.S. Cl. ............................ 242/199; 352/72
[51] Int. Cl.² ................. G03B 1/04; G11B 15/32
[58] Field of Search ............... 242/197, 200, 192; 352/72, 78 R; 360/96, 132

[56] References Cited
UNITED STATES PATENTS

| 3,653,608 | 4/1972 | Dickens et al. | 242/199 |
| 3,706,426 | 12/1972 | Prahl | 242/198 |
| 3,894,796 | 7/1975 | Cook et al. | 352/72 |

Primary Examiner—Leonard D. Christian
Attorney, Agent, or Firm—Cruzan Alexander; Donald M. Sell; G. Brian Pingel

[57] ABSTRACT

An improved video tape cartridge having a main wall, two parallel sidewalls and two L-shaped doors hingedly connected to the main wall to form a rectangularly shaped box like structure for semipermanently enclosing two tape reels journaled therein. The tape reels include spring loaded bearing members that normally engage one of the housing sidewalls to journal the reels in the cartridge, but the bearing members are compressible into a condition disengaged from the sidewalls to release the reels from the cartridge. Guide members are disposed at each end of the cartridge to hold the tape in a position for engagement with a record/reproduce unit, at least one of which guide members is movable from a normal operating condition into a reel removal condition to facilitate removal of both reels from the cartridge.

2 Claims, 5 Drawing Figures

TAPE CARTRIDGE WITH MOVABLE GUIDE MEMBER

BACKGROUND OF THE INVENTION

1. Field of the Invention

The present invention relates in general to video tape cartridges and more specifically to cartridges having removable tape reels.

2. Description of the Prior Art

Video tape cartridges with at least one removable reel are known in the art as described in U.S. Patent to Dickens et al, U.S. Pat. No. 3,653,608. The Dickens et al patent discloses a video tape cartridge having three fixed walls and two hinged "L"-shaped members that cooperate together to define a housing. Such cartridge includes two video tape reels, one of which is removable from the cartridge to permit repair or exchange of the tape in the housing. Reel removal from the Dickens et al cartridge is accomplished by means of one of the cartridge sidewalls having a large removable circular portion in axial alignment with a reel. When the sidewall portion is removed, the aligned reel can be taken out of the cartridge through the hole vacated by such portion. However, this type of tape reel removal is only possible if all the tape is wound on only one of the reels.

Although the above Dickens et al cartridge permits removal of one of the cartridge reels therefrom, it is highly preferable to provide a cartridge from which both reels can be removed in order that there is no necessity for having to wind all the tape on a single reel of the cartridge.

SUMMARY OF THE INVENTION

The present invention provides an improved video tape cartridge in the shape of a rectangular housing that semipermanently encloses a pair of spaced reels in parallel relationship, and includes guide means disposed within the housing for holding the tape in a proper position for engagement with a record/reproduce unit. The reels are each journaled in the cartridge housing with the aid of a spring loaded bearing member that is compressible to disengage the reels from the housing, and one of the guide means is mounted on a pivotable frame in order to provide a sufficient opening to remove the reel adjacent thereto from the cartridge when it is disengaged therefrom.

It is a principal object of the present invention to provide a video tape cartridge that includes a pair of tape reels that are both easily removable from the cartridge in such fashion that the tape on the reels does not have to be entirely removed from either reel. Accordingly, a tape format included in the cartridge of the present invention can be readily exchanged for another with a minimum of time and expense.

DESCRIPTION OF THE PREFERRED EMBODIMENTS

Figure 1:
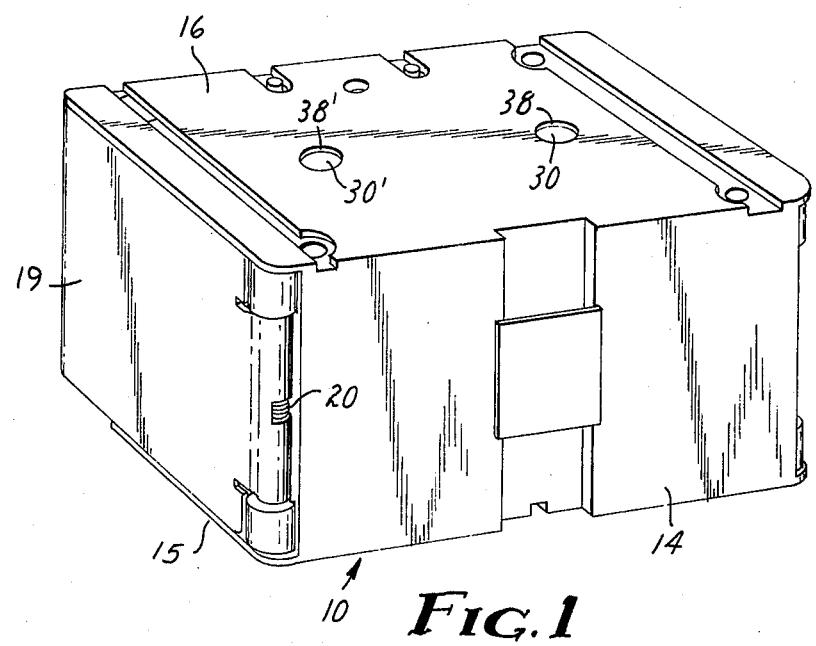
FIG. 1 is a perspective rear view in elevation of a preferred embodiment of the tape cartridge of the present invention.
Figure 2:
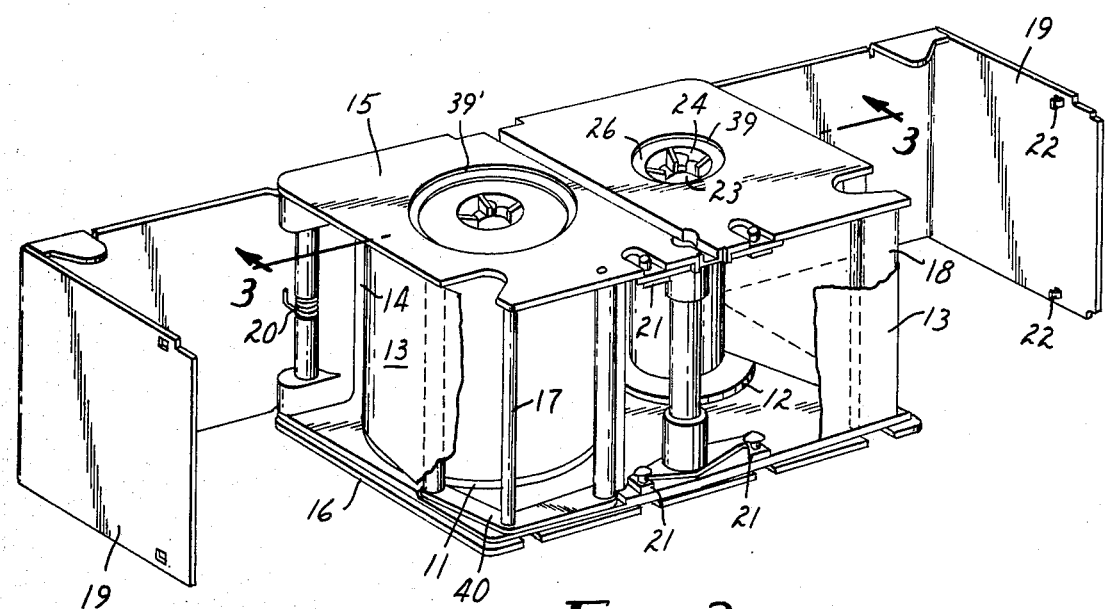
FIG. 2 is a perspective front view in elevation of the cartridge of FIG. 1 with two hinged doors of the cartridge in an open condition to expose interior construction including two reels about which video is wound.

Referring now to the drawings and with reference first to FIGS. 1 and 2, a preferred embodiment of an improved video tape cartridge 10 of the present invention is shown. The cartridge 10 is adapted to store a large tape reel 11 and a small tape reel 12 in a side-by-side parallel relationship for supporting a video tape 13 wound thereon.

The cartridge 10 is formed from a three-sided structure that is preferably of molded plastic and includes a rectangularly shaped main wall 14 and two parallel, rectangularly shaped sidewalls 15 and 16 that extend from opposite sides of the main wall 14. Tape guide members 17 and 18 bridge between opposite ends of the sidewalls 15 and 16 for holding the tape in a proper position for engagement with a record/reproduce unit.

The cartridge 10 also includes two L-shaped interlocking doors 19 that are each hingedly connected at one end to one of the remaining sides of the main wall 14 such that when the doors 19 are in a fully open position, as shown in FIG. 2, three sides of the cartridge 10 are open, and when in a fully closed position the doors 19 serve to substantially seal off the cartridge 10, as shown in FIG. 1. The doors 19 are biased by springs 20 that urge them to their fully open position. Thus, to maintain the doors 19 in a fully closed condition, catch means 21 are attached to the sidewalls 15 and 16 for cooperating with nibs 22 on the doors 19 to semipermanently hold the doors shut. When the doors 19 are released by the catch means 21 they spring to a fully open position.

The cartridge 10 resembles the cartridge described in U.S. Pat. No. 3,653,608 issued Apr. 4, 1972 and incorporated herein by reference. The major difference between the cartridge of the present invention and that described in the aforementioned patent is the manner in which both reels 11 and 12 of the present invention are removable from the cartridge 10, and such difference will become more apparent from the following description.

Figure 3:
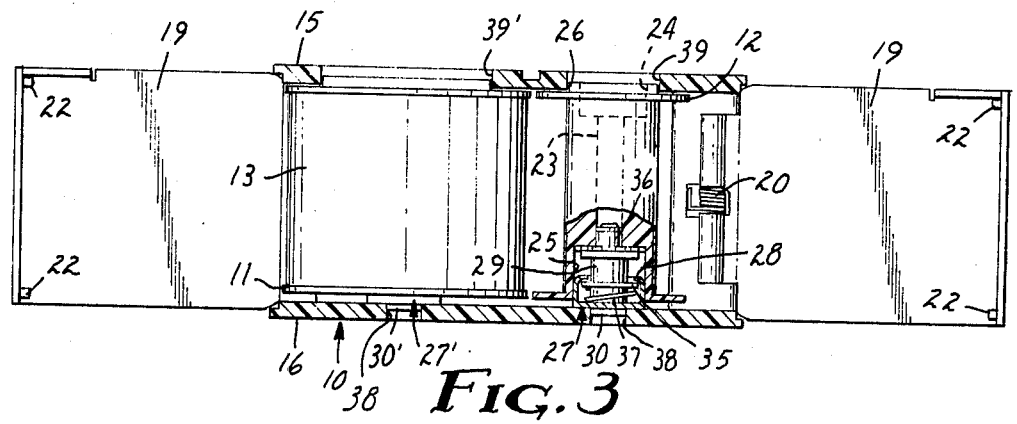
FIG. 3 is a cross sectional view of the cartridge of FIG. 1 taken along the line 3—3 of FIG. 2 and with portions of one of the reels broken away to show interior construction.

Referring now to FIG. 3, the reels 11 and 12 are basically similar in construction and therefore differ from one another primarily only in size. Thus, for purposes of simplicity and clarity only the reel 12 will be described, with similar exposed components of the reel 11 being indicated by primed numbers.

Figure 4:
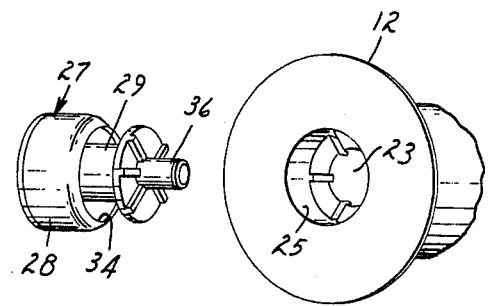
FIG. 4 is perspective view taken on diverging axes of a fragmentary portion of one of the cartridge reels, and a bearing member that serves to fix the reel in the cartridge.

The reel 12 includes an axial center bore 23 that opens into cavities 24 and 25 at opposite ends of the reel. A portion of the cavity 24 is defined by an outwardly projecting annulus 26 and the sidewall of the cavity 24 includes teeth for engaging the drive arm of a player unit. As seen in FIG. 4, the bottom wall of the cavity 25 includes radially disposed recesses adapted to engage a spring loaded bearing member 27 that seats in the cavity 25.

Referring again to FIG. 3, the bearing member 27 is formed of a cylindrically shaped socket portion 28 and a relatively elongated body portion 29. The socket portion 28 includes a circularly shaped node 30 on one side and an opening 34 at the opposite side. The body portion 29 has a flange 35 at one end that is disposed within the socket 28 and a hub 36 at the opposite end. The flange 35 is larger in diameter than the socket opening 34 to prevent removal of the flange 35 from the socket 28. A thin coil spring 37 is interposed between the interior wall of the socket 28 and the flange 35 to normally urge the same against the periphery of the opening 34. However, the length of the bearing member 27 can be reduced by exerting sufficient pressure on the body portion 29 to overcome the force of the spring 37 and move the body portion 29 further into the socket 28.

As best seen in FIG. 3, the bearing member 27 serves to support one end of the reel 12 in the cartridge 10, with the node 30 protruding into one of two apertures 38 in the sidewall 16, and the hub 36 extending into the reel bore 23. The opposite end of the reel 12 is supported by protrusion of the annulus 26 into an aperture 39 in the sidewall 15. Thus, the reel is journaled into the cartridge 10, with the spring loaded bearing member 27 serving to normally maintain the reel 11 in its journaled position. A primary aspect of the present invention is that the bearing members 27 of the reels 11 and 12 can be compressed to disengage their respective nodes 30 and 30' from the apertures 38 and their respective annuluses 26 and 26' from the apertures 39 and 39' in order to disengage the reels 11 and 12 from the sidewalls 15 and 16.

Figure 5:
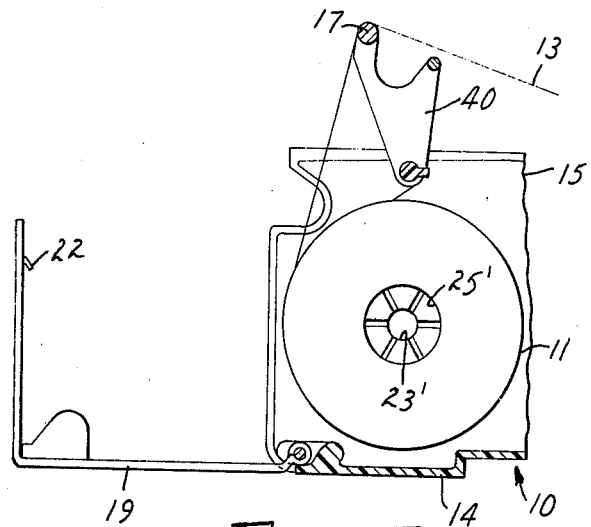
FIG. 5 is a fragmentary end view of the cartridge of FIG. 1 showing a tape guide member of the cartridge swung up in a reel removal position.

Once disengaged from the housing sidewalls 15 and 16, the small reel 11 can be readily removed from the cartridge 10. However, the diameter of the reel 12 is sufficiently large that the guide member 17 prevents removal of such reel when it is positioned in an operating position as shown in FIG. 2. To overcome this problem with reel removal, a further aspect of the present invention is that the guide member 17 is mounted to one end of a frame structure 40 pinned to the sidewalls 15 and 16 at its opposite end. Thus, the guide member 17 may be pivoted into a reel removal position, as shown in FIG. 5 to permit removal of the large reel 11 from the housing. Therefore, the present invention provides a unique structure that permits both reels of the cartridge 10 to be removed therefrom without removing tape from either of the reels. Accordingly, various tape formats can readily be inserted into a particular housing in a fast and efficient manner.

What we claim is:

1. A video tape cartridge for housing a pair of spaced apart tape reels in parallel relationship to each other, which cartridge includes a fixed portion with a rectangularly shaped main wall and two parallel rectangularly shaped sidewalls that protrude from opposite side edges of said main wall for semipermanently journaling said reels in said housing, two L-shaped doors that are hingedly connected at one end to the other of the opposite side edges of said base wall, and guide means disposed between said sidewalls at opposite ends of said housing for holding tape on said reels in a proper position for engagement with a record/reproduce apparatus, said cartridge characterized by the feature that:

each of said reels includes a spring loaded bearing member that normally engages one of said sidewalls to support one end of its corresponding reel when in a relatively uncompressed condition and is disengaged from said one of said sidewalls in a compressed condition; and one of said guide means is movable from a normal operating position partially blocking the end of the housing in which it is disposed to an open position whereby said end is open to permit at least one of said reels to be removed from said cartridge through said open end when the bearing member of said reel is disengaged from one of said sidewalls.

2. A cartridge as recited in claim 1 wherein said one of said guide means is mounted on at least one movable member pinned to at least one of said sidewalls and pivotably movable between a normal operating position and an open position.

* * * * *